(12) United States Patent
Tsai et al.

(10) Patent No.: US 11,802,773 B2
(45) Date of Patent: Oct. 31, 2023

(54) METHOD FOR NAVIGATING AND ROUTE PLANNING BASED ON HD MAP, ELECTRONIC DEVICE, AND SERVER THEREOF

(71) Applicant: Mobile Drive Technology Co.,Ltd., New Taipei (TW)

(72) Inventors: Hsien-Chi Tsai, New Taipei (TW); Chun-Yu Chen, New Taipei (TW)

(73) Assignee: Mobile Drive Netherlands B.V., Amsterdam (NL)

( * ) Notice: Subject to any disclaimer, the term of this patent is extended or adjusted under 35 U.S.C. 154(b) by 496 days.

(21) Appl. No.: 16/917,807

(22) Filed: Jun. 30, 2020

(65) Prior Publication Data
US 2021/0293554 A1 Sep. 23, 2021

(30) Foreign Application Priority Data
Mar. 20, 2020 (CN) .......................... 202010203664.3

(51) Int. Cl.
*G01C 21/34* (2006.01)
*G01C 21/36* (2006.01)

(52) U.S. Cl.
CPC ..... *G01C 21/3415* (2013.01); *G01C 21/3691* (2013.01)

(58) Field of Classification Search
CPC .......................... G01C 21/3415; G01C 21/3691
See application file for complete search history.

(56) References Cited

U.S. PATENT DOCUMENTS

| 9,105,189 | B2 * | 8/2015 | Rubin ..................... H04W 4/06 |
| 9,644,981 | B1 * | 5/2017 | Barth ................. G01C 21/3655 |
| 9,719,792 | B2 * | 8/2017 | Barth ................. G01C 21/3667 |
| 9,805,601 | B1 * | 10/2017 | Fields .................. G08G 1/0129 |
| 9,868,394 | B1 * | 1/2018 | Fields ................... G06F 18/214 |
| 9,870,649 | B1 * | 1/2018 | Fields ............. G08G 1/096783 |
| 10,019,901 | B1 * | 7/2018 | Fields .................. G08G 1/0129 |
| 10,026,237 | B1 * | 7/2018 | Fields .................... G06Q 50/00 |
| 10,429,201 | B2 * | 10/2019 | Barth ................. G01C 21/3492 |
| 10,606,273 | B2 * | 3/2020 | Zhu ........................ G05D 1/0212 |
| 10,629,068 | B2 * | 4/2020 | Malkes .................. G08G 1/005 |
| 10,867,510 | B2 * | 12/2020 | Yang ..................... G05D 1/0246 |
| 11,086,327 | B2 * | 8/2021 | Sundar Pal .......... G08G 1/0116 |
| 11,255,688 | B2 * | 2/2022 | Barth ................... G08G 1/0133 |
| 11,326,891 | B2 * | 5/2022 | Choi ....................... G06F 3/017 |
| 11,338,855 | B2 * | 5/2022 | Ma ........................ G05D 1/0217 |

(Continued)

*Primary Examiner* — Luis A Martinez Borrero
(74) *Attorney, Agent, or Firm* — ScienBiziP, P.C.

(57) ABSTRACT

A method for navigating and route planning based on a HD map and with reference to other electronic devices moving along a similar route includes setting a start location and an end location; planning at least one navigation route based on the start location and the end location; acquiring locations of own electronic device and of co-travelling external electronic devices based on the HD map; acquiring speeds of the external electronic devices and selecting those moving at low speed; identifying moving directions of the slow-speed target electronic devices; and re-planning and resetting the at least one navigation route when the moving directions of the target electronic devices intersected with a direction of the lane. An electronic device and a server applying the method are also disclosed.

20 Claims, 3 Drawing Sheets

(56) References Cited

U.S. PATENT DOCUMENTS

| | | | |
|---|---|---|---|
| 2002/0165664 A1* | 11/2002 | Park | G08G 1/096816 340/990 |
| 2013/0282271 A1* | 10/2013 | Rubin | H04W 4/027 701/410 |
| 2016/0216130 A1* | 7/2016 | Abramson | G01C 21/3423 |
| 2016/0358468 A1* | 12/2016 | McGavran | G01C 21/3691 |
| 2017/0108343 A1* | 4/2017 | Barth | G01C 21/3658 |
| 2017/0122759 A1* | 5/2017 | Barth | G08G 1/0133 |
| 2017/0284814 A1* | 10/2017 | Gaither | G01C 21/3658 |
| 2017/0363434 A1* | 12/2017 | Barth | G01C 21/3415 |
| 2018/0299285 A1* | 10/2018 | Morita | G01C 21/3492 |
| 2018/0307233 A1* | 10/2018 | Zhu | G01C 21/3415 |
| 2018/0322779 A1* | 11/2018 | Pundurs | G08G 1/091 |
| 2019/0084571 A1* | 3/2019 | Zhu | B60W 30/18163 |
| 2019/0311614 A1* | 10/2019 | Yang | G08G 1/052 |
| 2019/0316919 A1* | 10/2019 | Keshavamurthy | G08G 1/096844 |
| 2019/0333369 A1* | 10/2019 | Malkes | G08G 1/096838 |
| 2020/0049525 A1* | 2/2020 | Barth | G01C 21/3655 |
| 2020/0064142 A1* | 2/2020 | Choi | G06T 19/006 |
| 2020/0142418 A1* | 5/2020 | Sundar Pal | G08G 1/0116 |
| 2020/0238999 A1* | 7/2020 | Batts | G01S 17/86 |
| 2020/0294401 A1* | 9/2020 | Kerecsen | G05D 1/0287 |
| 2021/0055122 A1* | 2/2021 | Pham | G08G 1/0145 |
| 2022/0155085 A1* | 5/2022 | Barth | G01C 21/3694 |

\* cited by examiner

METHOD FOR NAVIGATING AND ROUTE PLANNING BASED ON HD MAP, ELECTRONIC DEVICE, AND SERVER THEREOF

FIELD

The subject matter herein generally relates to journey-planning for road traffic.

BACKGROUND

Navigation software became more portable and convenient. Navigation software can set a start position and an end position according to user's command, and plan at least one navigation route based on the set start position and the end position. The user can select one route based on a travel time and a traffic congestion condition. The congestion condition is forecast by vehicles on the selected navigation route, the congestion condition fails to take account of a crowd gathering on a road, such as a demonstration or onlookers at an event. There is no prompt information based on the crowd gathering on the road.

Thus, there is room for improvement in the art.

BRIEF DESCRIPTION OF THE FIGURES

Implementations of the present disclosure will now be described, by way of example only, with reference to the attached figures.

DETAILED DESCRIPTION

Figure 1:
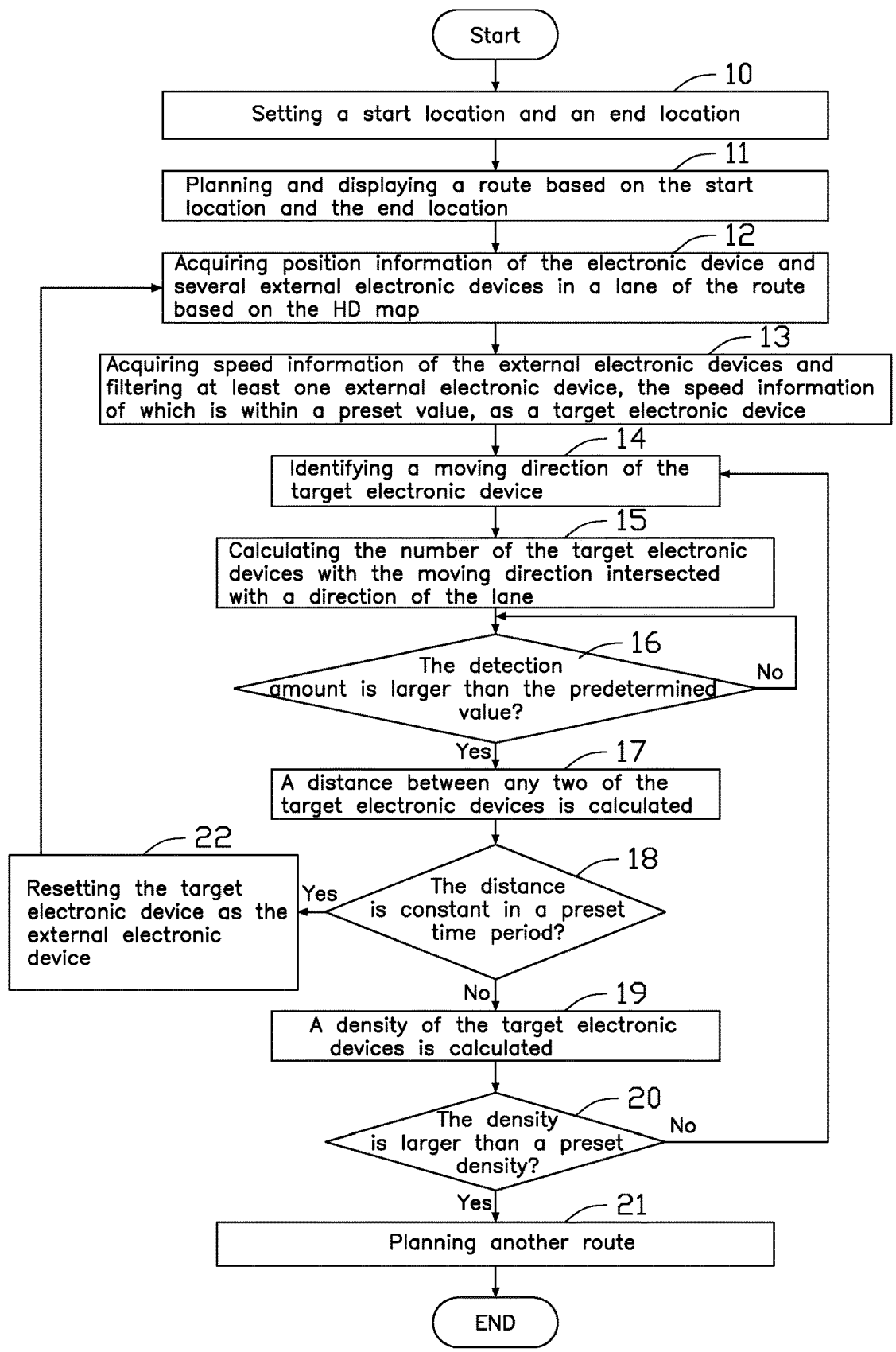
FIG. 1 is a flowchart illustrating an embodiment of a navigating and route planning method.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

In general, the word "module," as used herein, refers to logic embodied in hardware or firmware, or to a collection of software instructions, written in a programming language, for example, Java, C, or assembly. One or more software instructions in the modules may be embedded in firmware, such as an EPROM, magnetic, or optical drives. It will be appreciated that modules may comprise connected logic units, such as gates and flip-flops, and may comprise programmable units, such as programmable gate arrays or processors, such as a CPU. The modules described herein may be implemented as either software and/or hardware modules and may be stored in any type of computer-readable medium or other computer storage systems. The term "comprising" means "including, but not necessarily limited to"; it specifically indicates open-ended inclusion or membership in a so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one."

The present disclosure provides a method for navigating and route planning based on a high-definition (HD) map used in a vehicle.

Figure 3:
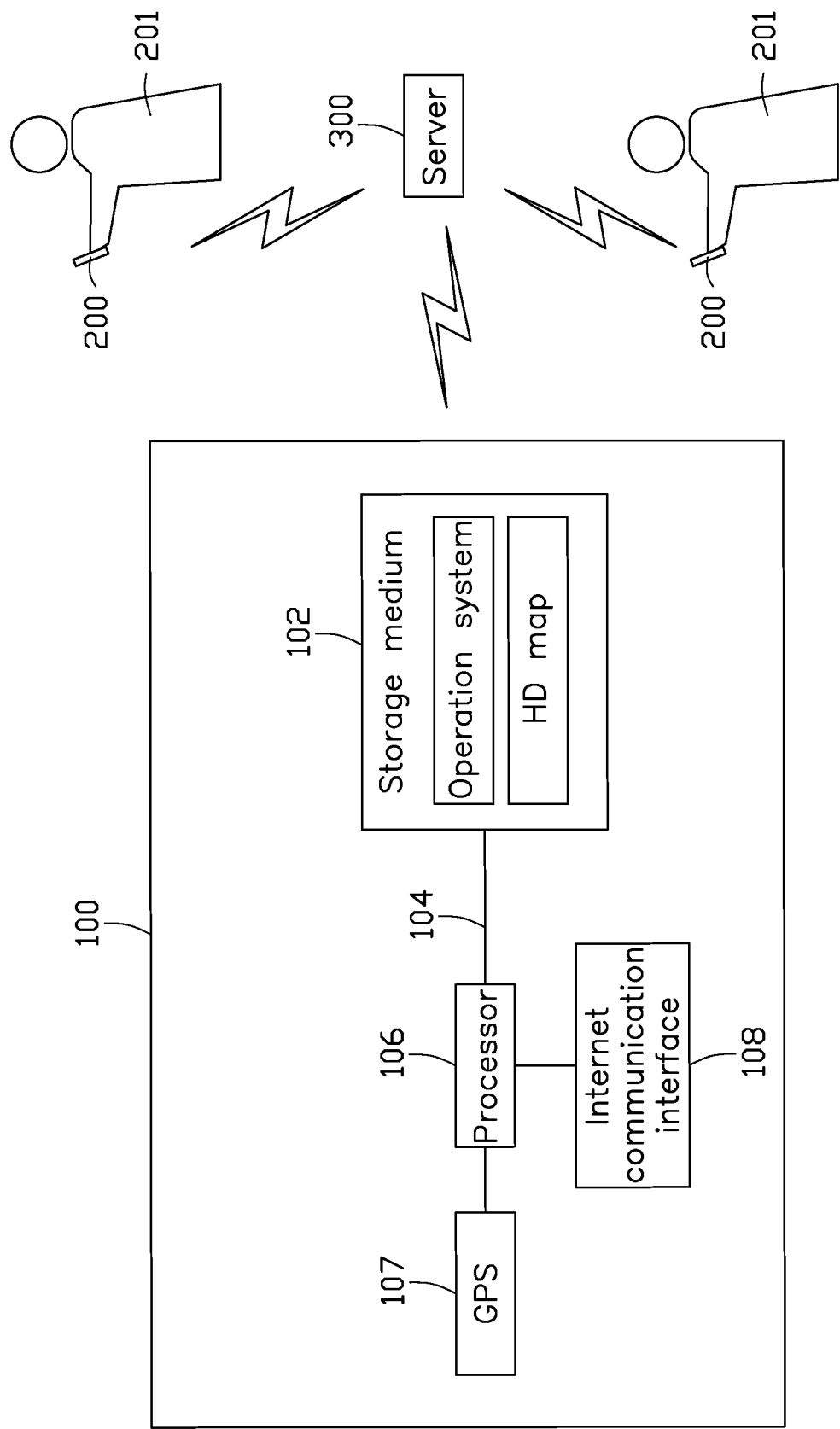
FIG. 3 is a diagram illustrating an embodiment of an electronic device.

FIG. 1 shows a flowchart of a method for the above. The method is used in a navigating and route planning system with an electronic device 100 (as shown in FIG. 3) and at least one server 300 (as shown in FIG. 3). Data between the electronic device 100 and the at least one server 300 is transmitted by a specified protocol. In one embodiment, the specified protocol can be a Hyper Text Transfer Protocol (HTTP), or a Hyper Text Transfer Protocol over Secure Socket Layer (HTTPS), but not being limited hereto. In one embodiment, the server can be a single server, or can be a group of servers having different functions. The electronic device 100 can be a movable terminal with a networking function, such a personal computer, a tablet, a smart phone, a personal digital assistant (PDA), a game machine, an internet protocol television (IPTV), a smart wearable device, or a navigator. The terminal device can be a fixed terminal with a networking function, such as a desktop computer or a digital television. In one embodiment, the electronic device 100 is in a vehicle. The navigating system provides a visible interface. The visible interface provides an interface for users to communicate with the electronic device 100. The HD map incudes lane information, lane indication information, traffic signal information, and speed limit information, and so on. The method can detect a crowd gathered or other obstacle in a specified region on a planning route, determining a specified region as a congestion region when the gathered crowd is detected, and re-plan the navigation route to avoid the congestion region. The method may comprise the following steps, which also may be re-ordered:

In Step 10, a start location and an end location are set by the electronic device 100.

In one embodiment, the start location can be a current location of the electronic device 100, and can be a specified location defined by a user, such as a specified street name, a business location name, or a landmark name.

In Step 11, a route is planned and displayed based on the start location and the end location by the electronic device 100 or the server 300.

In one embodiment, the route is labeled with a first specified tag. In other embodiment, several routes can be planned by the server 300, and are displayed on the electronic device 100. In another embodiment, several routes can be planned by the electronic device 100, and are displayed on the electronic device 100.

In Step 12, position information of the electronic device 100 and several external electronic devices within a lane of the route are acquired by the server 300 based on the HD map.

In one embodiment, the external electronic devices are located within a preset range around the electronic device 100. The preset range can be a circular range with a preset radius, and a center of the circular range is the location of the electronic device 100. The external electronic device are used for representing pedestrian carried with an electronic device. In other embodiments, the preset range also can be a semicircular with the preset radius, and the center of the semicircular range is the location of the electronic device 100, the preset range covering the at least one navigation route. Data between the external electronic device and the at least one server 300 is transmitted by a wireless protocol. The wireless protocol can be a IMT-2020, a Global system of mobile communication (GSM), a General, packet radio service (GPRS), a Code division multiple access 2000 (CDMA2000), a Wideband code division multiple access (WCDMA), a Time division-synchronous code division multiple access (TD-SCDMA), a Frequency division duplexing-long term evolution (FDD-LET), or a Time division duplexing-long term evolution (TDD-LET), not being limited hereto.

In Step 13, respective speed information of the external electronic devices are acquired by the server 300, and at least one external electronic device within a preset value, is filtered by the server 300 as a target electronic device.

In one embodiment, the preset value can be 5 kilometer per hour.

In Step 14, a moving direction of the target electronic device is identified by the server 300.

In Step 15, the number of the target electronic devices is calculated with the moving direction which intersect with a direction of the lane by the server 300.

In Step 16, whether the calculated number is larger than the predetermined value is determined by the server 300.

In Step 17, a distance between any two of the target electronic devices is calculated by the server 300 when the calculated number is larger than the predetermined value.

When the calculated number is less than or equal to the predetermined value, the process returns to Step S16.

In Step 18, whether the distance between target electronic devices is constant in a preset time period is determined by the server 300.

In Step 19, a density of the target electronic devices is calculated by the server 300 when the distance is not constant in the preset time period.

In one embodiment, the density of the target electronic devices can be calculated based on quantity and a distribution range of the target electronic devices, or can be calculated based on a width of the lane with the target electronic devices and the number of the target electronic devices. The width can be a sum of lane fragments or a continuous lane. In other embodiment, the density of the target electronic device can be calculated by the preset range and the number of the target electronic devices.

In Step 20, whether the density of the target electronic devices is larger than a preset density is determined by the server 300.

In one embodiment, the preset density can be 20 passengers in the distribution range, or in the lane, or in the preset range.

Step 21 plans another route by the server 300 when the density of the target electronic devices is larger than the preset density.

Step 22 resets the target electronic device as the external electronic device by the server 300 when the distance is constant in the preset time period.

When the density of the target electronic devices is less than or equal to the preset density, the process returns to Step 14.

In one embodiment, on the electronic device 100, the region of the target electronic devices with a density larger than the preset density is labeled with a specified tag. The specified tag can be a colored or other tag to differentiate such region within the at least one navigation route.

Based on the above navigating and route planning method based on the HD map, acquiring information of the target electronic devices connected with the server, determining a density of the crowd gathered, and planning another route when the density of the crowd gathered or other obstacle is causing a density larger than the preset density, thus an intelligence of the navigating and route planning method is enhanced and improved.

Figure 2:
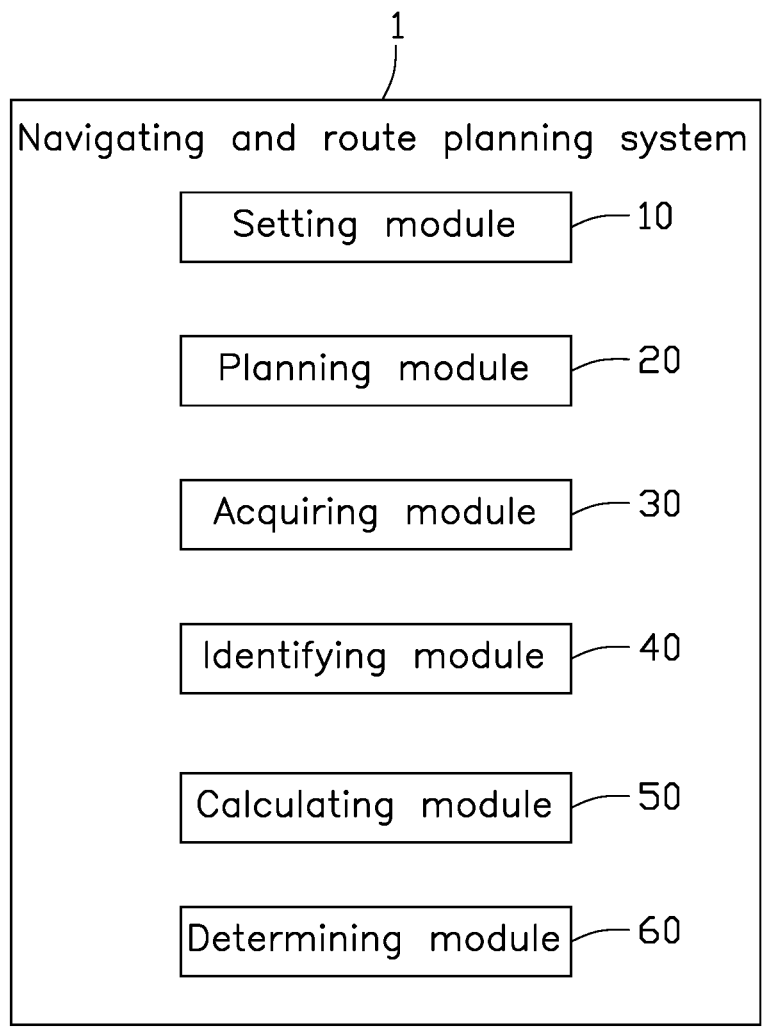
FIG. 2 is a diagram illustrating an embodiment of a navigating and route planning system.

FIG. 2 shows a navigating and route planning system 1 (hereinafter referred to as "system 1"). The system 1 can include one or more modules. The one or more modules are stored in a storage medium 102 (as shown in FIG. 3) and can be implemented by at least one processor 106 (as shown in FIG. 3) for executing a route planning function.

In one embodiment, the system 1 includes:

A setting module 10 sets the start location and the end location by an electronic device 100.

In one embodiment, the start location can be a current location of the electronic device 100, and can be a preset location defined by a user, such as a preset street name, a business location name, or a landmark name.

A planning module 20 plans and displays a route based on the start location and the end location by an electronic device 100 or a server 300.

In one embodiment, the route is labeled with a first specified tag. In other embodiment, several routes can be planned by the server 300, and are displayed on the electronic device 100. In another embodiment, several routes can be planned by the electronic device 100, and are displayed on the electronic device 100.

An acquiring module 30 acquires position information of the electronic device 100 and external electronic devices within lanes of the route based on the HD map by the server 300.

In one embodiment, the external electronic devices are located within a preset range around the electronic device 100. The preset range can be a circular range with a preset radius, and a center of the circular range is the location of the electronic device 100. The external electronic device are used for representing pedestrian. In other embodiments, the preset range also can be semicircular with the preset radius, and the center of the semicircular range is the location of the electronic device 100, the preset range covering the at least one navigation route. Data between the external electronic device and the at least one server 300 is transmitted by a wireless protocol. The wireless protocol can be a IMT-2020, a Global system of mobile communication (GSM), a General, packet radio service (GPRS), a Code division multiple access 2000 (CDMA2000), a Wideband code division multiple access (WCDMA), a Time division-synchronous code division multiple access (TD-SCDMA), a Frequency division duplexing-long term evolution (FDD-LET), or a Time division duplexing-long term evolution (TDD-LET), not being limited hereto.

The acquiring module 30 further respectively acquires speed information of the external electronic devices and at least one external electronic device, the speed information of which is within a preset value, is filtered by the server 300 as a target electronic device.

In one embodiment, the preset value can be 5 kilometer per hour.

An identifying module 40 identifies a moving direction of the target electronic device by the server 300.

A calculating module 50 calculates the number of target electronic devices with the moving direction which intersect with the direction of the lane by the server 300.

A determining module 60 determines whether the calculated number is larger than the predetermined value by the server 300.

The calculating module 50 further calculates a distance between any two of the target electronic devices by the sever 300 when the calculated number is larger than the predetermined value.

The determining module 60 further determines whether the distance between target electronic devices is constant in a preset time period by the server 300.

The calculating module 50 further calculates a density of the target electronic devices by the server 300 when the distance is not constant in the preset time period.

In one embodiment, the density of the target electronic devices can be calculated based on amount and a distribution range of the target electronic devices, or can be calculated based on a width of the lane with the target electronic devices and the number of the target electronic devices. The width can be a sum of lane fragments or a continuous lane. In other embodiment, the density of the target electronic devices can be calculated by the preset range and the number of target electronic devices.

The determining module 60 further determines whether the density of the target electronic devices is larger than a preset density by the server 300.

In one embodiment, the preset density can be 20 passengers in the distribution range, or in the lane, or in the preset range.

The planning module 20 further plans another route by the server 300 when the density of the target electronic devices is larger than the preset density.

In one embodiment, on the electronic device 100, the region of the target electronic devices with the density larger than the preset density is labeled with a specified tag. The specified tag can be a colored or other tag to differentiate the region within the at least one navigation route.

The setting module 10 further resets the target electronic devices as the external electronic devices by the server 300 when the distance is constant in the preset time period.

FIG. 3 shows the electronic device 100. The electronic device 100 includes at least one storage medium 102, a data bus 104, at least one processor 106, a GPS 107, and an internet communication interface 108.

The at least one storage medium 102 stores program codes. The at least one storage medium 102 can be an embedded circuit having a storing function, such as memory card, trans-flash card, smart media card, secure digital card, and flash card, and so on. The at least one storage medium 102 transmits data with the at least one processor 106 through the data bus 104. The at least one storage medium 102 stores an operation system and a HD map. The operation system manages and controls hardware and programs of software. The operation system further supports a part of operations of the system 1 (as shown in FIG. 2) and other software and programs. The GPS 107 locates the position of the electronic device 100. The internet communication interface 108 establishes communications between the members in the at least one storage medium 102, and communications between the hardware and the software in the electronic device 100.

The at least one processor 106 can be a micro-processor, or a digital processor. The at least one processor 106 is used for running the program codes stored in the at least one storage device 102 to execute different functions. The modules in FIG. 2 are program codes stored in the at least one storage medium 102 and are implemented by the at least one processor 106 for executing the method for route planning. The at least one processor 106 can be a central processing unit (CPU), or a large scale integrated circuit, being an operating core and a control core.

The at least one processor 106 executes commands stored in the at least one storage device 102 to perform the method. The commands executed by the processor 106 perform the following steps:

In Step 10, a start location and an end location are set by the electronic device 100.

In one embodiment, the start location can be a current location of the electronic device 100, and can be a specified location defined by a user, such as a specified street name, a business location name, or a landmark name.

In Step 11, a route based on the start location and the end location are planned by the electronic device 100 or the server 300 and displayed on the electronic device 100.

In one embodiment, the route is labeled with a first specified tag. In other embodiment, several routes can be planned by the server 300, and are displayed on the electronic device 100. In another embodiment, several routes can be planned by the electronic device 100, and are displayed on the electronic device 100.

In Step 12, position information of the electronic device 100 and several external electronic devices 200 within a lane of the route are acquired by the server 300 based on the HD map.

In one embodiment, the external electronic devices 200 are located within a preset range around the electronic device 100. The preset range can be a circular range with a preset radius, and a center of the circular range is the location of the electronic device 100. The external electronic device 200 is used for representing pedestrian 201. In other embodiments, the preset range also can be a semicircular with the preset radius, and the center of the semicircular range is the location of the electronic device 100, the preset range covering the at least one navigation route. Data between the external electronic device 200 and the at least one server 300 is transmitted by a wireless protocol. The wireless protocol can be a IMT-2020, a Global system of mobile communication (GSM), a General, packet radio service (GPRS), a Code division multiple access 2000 (CDMA2000), a Wideband code division multiple access (WCDMA), a Time division-synchronous code division multiple access (TD-SCDMA), a Frequency division duplexing-long term evolution (FDD-LET), or a Time division duplexing-long term evolution (TDD-LET), not being limited hereto.

In Step 13, respective speed information of the external electronic devices 200 are acquired by the server 300, and at least one external electronic device 200, the speed information of which is within a preset value, is filtered as a target electronic devices by the server 300.

In one embodiment, the preset value can be 5 kilometer per hour.

In Step 14, a moving direction of the target electronic device is identified by the server 300.

In Step 15, the number of the target electronic devices with the moving direction intersecting with a direction of the lane is calculated by the server 300.

In Step 16, whether the calculated number is larger than the predetermined value is determined by the server 300.

In Step 17, a distance between any two of the target electronic devices is calculated by the server 300 when the calculated number is larger than the predetermined value.

When the calculated number is less than or equal to the predetermined value, the process returns to Step 16.

In Step 18, whether the distance between target electronic devices is constant in the preset time period is determined by the server 300.

In Step 19, a density of the target electronic devices is calculated by the server 300 when the distance is not constant in the preset time period is calculated by the server 300.

In one embodiment, the density of the target electronic devices can be calculated based on quantity and a distribution range of the target electronic devices, or can be calculated based on a width of the lane with the target electronic devices and the number of the target electronic devices. The width can be a sum of lane fragments or a continuous lane. In other embodiment, the density of the target electronic device can be calculated by the specified range and the number of the target electronic devices.

In Step 20, whether the density of the target electronic devices is larger than a preset density is determined by the server 300.

In one embodiment, the preset density can be 20 passengers in the distribution range, or in the lane, or in the preset range.

Step 21 plans another route by the server 300 when the density of the target electronic devices is larger than the preset density.

Step 22 resets the target electronic devices as the external electronic devices 200 by the server 300 when the distance is constant in the preset time period.

When the density of the target electronic devices is less than or equal to the preset density, the process returns to Step 14.

In one embodiment, on the electronic device 100, the region of the target electronic devices with the density larger than the preset density is labeled with a specified tag. The specified tag can be a colored tag being different within the at least one navigation route or can be a pattern tag being different within the at least one navigation route, not being limited hereto.

Based on the above navigating and route planning method based on the HD map, acquiring information of the target electronic device connected with the server, determining a magnitude of obstacle, and planning another route when the magnitude is large, intelligence of the method is enhanced and improved.

While various and preferred embodiments have been described the disclosure is not limited thereto. On the contrary, various modifications and similar arrangements (as would be apparent to those skilled in the art) are also intended to be covered. Therefore, the scope of the appended claims should be accorded the broadest interpretation so as to encompass all such modifications and similar arrangements.

What is claimed is:

1. A method for navigating and route planning based on a high-definition (HD) map used in a system with an electronic device, a plurality of external electronic devices, and a server, which are communicated with each other; the method comprising:
    setting a start location and an end location by the electronic device;
    planning a route based on the start location and the end location by the electronic device or the server;
    acquiring position information of the electronic device and a plurality of external electronic devices within a lane of the route by the server, each of the plurality of external electronic devices being configured to represent a pedestrian carrying one of the plurality of external electronic devices;
    acquiring speed information of the plurality of external electronic devices and filtering one or more external electronic devices, the speed information of which are within a preset value, as one or more target electronic devices configured to represent one or more target pedestrians by the server;
    identifying a moving direction of each of the one or more target electronic devices by the server;
    calculating a number of the target electronic devices having a moving direction intersecting a lane by the server; and
    planning another route when the number of the one or more target electronic devices having the moving directions intersecting the lane reaches a predetermined value by the server.

2. The method of claim 1, further comprising:
    calculating a distance between any two of the target electronic devices when the number of the one or more target electronic devices having the moving directions intersecting the lane reaches the predetermined value by the server.

3. The method of claim 2, further comprising:
    determining whether the distance between any two of the one or more target electronic devices remains constant in a preset time period by the server;
    calculating a density of the one or more target electronic devices configured to represent the one or more target pedestrians within the lane when the distance between any two of the one or more target electronic devices configured to represent the one or more target pedestrians varies in the preset time period by the server;
    determining whether the density of the one or more target electronic devices is larger than a preset density; and
    when the density of the one or more target electronic devices is larger than the preset density, the server determines that the number of the one or more target electronic devices having the moving directions intersecting the lane reaches the predetermined value.

4. The method of claim 2, further comprising:
    determining whether the distance between any two of the one or more target electronic devices remains constant in a preset time period by the server; and
    setting the one or more target electronic devices as the external electronic devices when the distance between any two of the one or more target electronic devices remains constant in the preset time period by the server.

5. The method of claim 1, wherein the electronic device is disposed in a vehicle.

6. An electronic device communicates with a server; the server further communicates with external electronic devices; the electronic device comprises a storage medium and at least one processor; the storage medium stores at least one command, which when executed by the at least one processor, cause the at least one processor to:
    set a start location and an end location;
    receive a route planned by the server based on the start location and the end location;
    acquire position information of the electronic device and a plurality of external electronic devices within a lane of the route based on a high-definition (HD) map from the server, each of the plurality of external electronic devices being configured to represent a pedestrian carrying one of the plurality of external electronic devices;

acquire respectively speed information of the plurality of the external electronic devices from the server, and receive one or more external electronic devices, the speed information of which are within a preset value, as one or more target electronic devices configured to represent one or more target pedestrians filtered by the server; and receive a moving direction of each of the one or more target electronic devices identified by the server;

receive a number of the target electronic devices having a moving direction intersecting a lane; and receive another route planned by the server when the number of the one or more target electronic devices having the moving directions intersecting the lane reaches a predetermined value.

7. The electronic device of claim 6, further causing the at least one processor to: when the number of the one or more target electronic devices having the moving directions intersecting the lane reaches the predetermined value by the server, receive a distance between any two of target electronic devices calculated by the server.

8. The electronic device of claim 7, further causing the at least one processor to: when the distance between any two of the one or more target electronic devices configured to represent the one or more target pedestrians varies in the preset period determined by the server, receive a density of the one or more target electronic devices configured to represent the one or more target pedestrians within the lane calculated by the server.

9. The electronic device of claim 7, further causing the at least one processor to: when the distance between any two of the one or more target electronic devices remains constant in the preset period determined by the server, set the one or more target electronic devices as the external electronic devices.

10. The electronic device of claim 6, wherein the electronic device is disposed in a vehicle.

11. A server, the server communicates with an electronic device; the server communicates with a plurality of external devices, and stores at least one command; the at least one command is implemented by a processor to execute the following steps:

receiving a start location and an end location set by the electronic device;

planning a route based on the start location and the end location;

acquiring position information of the electronic device and the external electronic devices within a lane of the route based on a high-definition (HD) map, each of the plurality of external electronic devices being configured to represent a pedestrian carrying one of the plurality of external electronic devices;

acquiring respectively speed information of the external electronic devices and filtering one or more external electronic devices, the speed information of which are within a preset speed, as one or more target electronic devices configured to represent one or more target pedestrians;

identifying a moving direction of each of the one or more target electronic devices;

calculating a number of the target electronic devices having a moving direction intersecting a lane; and planning another route when the number of the one or more target electronic devices having the moving directions intersecting the lane reaches a predetermined value.

12. The server of claim 11, further comprising:

calculating a distance between any two of the target electronic devices when the number of the one or more target electronic devices having the moving directions intersecting the lane reaches the predetermined value.

13. The server of claim 12, further comprising:

determining whether the distance between any two of the one or more target electronic devices remains constant in a preset time period;

calculating a density of the one or more target electronic devices configured to represent the one or more target pedestrians within the lane when the distance between any two of the one or more target electronic devices configured to represent the one or more target pedestrians varies in the preset time period;

determining whether the density of the one or more target electronic devices is larger than a preset density; and when the density of the one or more target electronic devices is larger than the preset density, determining that the number of the one or more target electronic devices having the moving directions intersecting the lane reaches the first predetermined value.

14. The server of claim 12, further comprising:

determining whether the distance between any two of the one or more target electronic devices remains constant in a preset time period by the server; and setting the one or more target electronic devices as the external electronic devices when the distance between any two of the one or more target electronic devices remains constant in the preset time period by the server.

15. The server of claim 11, wherein the electronic device is disposed in a vehicle.

16. The server of claim 13, wherein a region of the one or more target electronic devices with a density larger than the preset density is labeled with a specified tag.

17. The server of claim 13, wherein the density of the one or more target electronic devices is calculated based on an amount and a distribution range of the one or more target electronic devices.

18. The server of claim 13, wherein the density of the one or more target electronic devices is calculated based on a width of the lane with the one or more target electronic devices and the amount of the one or more target electronic devices.

19. The server of claim 11, wherein the external electronic device are located within a specified range around the electronic device.

20. The server of claim 19, wherein the specified range is a circle with a specified radius, and a center of the circle is the location of the electronic device.

* * * * *